(12) United States Patent
Carlyle

(10) Patent No.: US 6,439,821 B1
(45) Date of Patent: Aug. 27, 2002

(54) HOPPER FEED REGULATING APPARATUS

(76) Inventor: Kenneth Carlyle, 685 Highway 254, Cleveland, GA (US) 30528

( * ) Notice: Subject to any disclaimer, the term of this patent is extended or adjusted under 35 U.S.C. 154(b) by 0 days.

(21) Appl. No.: 09/731,168

(22) Filed: Dec. 6, 2000

(51) Int. Cl.⁷ ........................ A01K 39/012; H01H 35/00
(52) U.S. Cl. .................. 414/296; 200/85 R; 200/61.21
(58) Field of Search ........................ 414/296; 200/85 R, 200/61.21

(56) References Cited

U.S. PATENT DOCUMENTS

| | | | | |
|---|---|---|---|---|
| 3,287,721 A | * | 11/1966 | Baehr | 200/85 R X |
| 3,389,387 A | * | 6/1968 | Hulse et al. | 200/85 R X |
| 3,497,023 A | | 2/1970 | Ramis | |
| 3,537,624 A | | 11/1970 | Hartman | |
| 3,818,159 A | * | 6/1974 | Evans et al. | 200/61.12 |
| 3,904,082 A | * | 9/1975 | Hostetler | 222/70 |
| 4,781,308 A | | 11/1988 | Yamano | |
| 5,389,753 A | * | 2/1995 | Harkins | 200/85 R |
| 5,782,201 A | | 7/1998 | Wells | |
| 5,921,200 A | | 7/1999 | Bondarenko | |
| 5,960,849 A | * | 10/1999 | Delaney et al. | 200/85 R X |
| 6,121,555 A | * | 9/2000 | Nowosielski et al. | 177/45 |

* cited by examiner

*Primary Examiner*—Steven A. Bratlie
(74) *Attorney, Agent, or Firm*—Kilpatrick Stockton LLP

(57) ABSTRACT

A hopper feed regulator is provided for controlling the supply of feed to a hopper efficiently without having to directly contact the feed. The assembly includes a chamber having a switch contact, lever, upper hanger, cam follower and spring biasing arrangement, a second member having a lower hanger, attached at one end to the spring biasing arrangement and a cam, and the other end from which the hopper is hung. A spring biasing arrangement pulls the first and second members together at a preset spring bias strength. As the weight of the feed gathered in the hopper increases, the lower hanger is pulled away from the chamber by compressing the spring biasing arrangement. The cam, which is attached to the spring biasing arrangement, moves axially down the chamber. The cam follower, attached to the cam switch, rolls along the cam and at a predetermined weight, pulls the lever away from the switch button, thereby disengaging the switch.

8 Claims, 4 Drawing Sheets

HOPPER FEED REGULATING APPARATUS

FIELD OF THE INVENTION

The present invention generally relates to an apparatus for automatically dispensing granular material, and more particularly to a hopper feed regulating device for controlling the supply of feed to livestock via a feed hopper.

BACKGROUND

In order for certain domesticated animals to efficiently gain weight, it is essential to provide them with adequate feed at all times. Accordingly, the amount of feed made available to the animals must be repeatedly and accurately adjusted depending on the growth of the animals.

One prior art attempt at maintaining the optimum level of feed to poultry comprises using a feed cart supported on an overhead rail to transport feed through a chicken house. The cart is manually rolled along the rail to feed stations throughout the house while feed is shoveled from the cart onto the floor level.

With the advent of automated chicken houses, feed may be automatically conveyed from a central hopper outside the house to feed receptacles distributed throughout the house without manual labor. In order to provide feed on an "as needed" basis, a multiplicity of feed pans or stations, which are typically hung from a ceiling or upper support, are arranged in rows along the length of the chicken coop and provided with feed when empty.

The feed pans are each connected to a conduit that, using an auger arrangement, delivers feed to the pans when an empty condition is sensed at the feed pans. The conduit is supplied from an intermediate hopper, positioned at one end of the chicken coop. When the level of feed in the intermediate hopper drops to a predetermined level, it is then re-supplied with feed from a main feed hopper, positioned outside of the chicken coop.

Contact switches are generally used both to sense the level of feed in the feed pans and to signal for the supply of feed to the feed pans from the intermediate hopper as needed. Additionally, a contact switching arrangement is provided to sense when feed to the intermediate hopper is needed from the primary feed hopper or silo.

Referring to FIG. 1, a known contact switch arrangement or flap switch for use in the intermediate hopper is generally illustrated at 11 and comprises a hinged flap 13 which pivots back and forth along the directions of arrow A so as to make a depressible contact switch 15 turn on and off. In this arrangement, the contact switch 15 is off when depressed and is on when released. In the on position, the contact switch 15 signals a feed motor to supply feed to the hopper.

Typically, the switch arrangement 11 is positioned in the hopper at a height that equals the desired level of feed when the hopper is full. Positioned adjacent the hinge flap 13 is a feed supply conduit 17 which pours feed B at the hinge flap 13. When the supply of feed to the hopper reaches the desired level in the hopper, the feed piles up in front of the flap 13 so that the weight of the pile pivots the hinge flap 13 back against the contact switch 15, thereby pushing the switch 15 to the off position and cutting off the supply of feed. As the level of feed falls, the weight of the pile of feed at the hinge flap 13 is reduced causing the flap 13 to spring forward and release contact switch 15 to the on position, as shown in FIG. 1, so as to signal for additional feed.

While operationally quite efficient when used at the feed pans, the flap switch 11 tends to hang-up when used in the intermediate hopper. Constant exposure to feed causes grease to build up on the hinge flap 13, making it difficult to spring back and release the contact switch 15 to the on position. As a result, when the flap switch 11 fails, the intermediate hopper is not supplied with feed from the main hopper and the plurality of feed pans become depleted of feed.

If, for example, the flap switch 11 hangs up in the middle of the night, the chickens may go without feed until the next morning. By then, the chickens are so hungry that when they are finally fed, they eat so quickly that the feed travels right through the animals without being fully digested. This results in an unacceptable conversion of feed to body weight.

A further deficiency of the known flap switch arrangement is its tendency to switch on and off or "bounce" at the cut off rather than letting the motor run uninterrupted until the level of feed in the hopper reaches the desired level.

A prior attempt at alleviating the deficiencies of the flap switch include Harkins, U.S. Pat. No. 5,389,753, which discloses a feed control switch for controlling the supply of feed to a hopper without the need to contact the feed.

Referring to FIG. 2, the Harkins feed control switch for supplying feed to an intermediate hopper is generally illustrated at 21. The apparatus comprises a first tubular member 23 having a hanger 25 from which the Harkins feed control switch is suspended and a second tubular member 29 slidably moveable relative to the first member 23, the second member 29 having a suspender 31 from which an intermediate feed hopper is suspended. A spring biasing arrangement 37, such as a helical coil compression spring, is provided for pulling the first and second members 23 and 29 together at a predetermined spring bias strength and a switch contact surface 28 is provided at the first member 23. An on/off switch 34 is positioned adjacent to the switch contact surface 28 and at the second member 29 so as to move with the second member, the switch 34 being in an off position when the switch 34 is at an extended position and being in an on position when the switch 34 is at a depressed position.

When the weight of feed in the hopper exceeds the predetermined spring bias strength of the spring biasing arrangement, the second member 29, which carries the switch 34, pulls away from the first member 23 causing the switch 34 to move away from and disengage the switch contact surface 28 at the first member 23. As a result, the switch 34 moves to the extended and off position, which signals a feed motor to terminate the supply of feed to be conveyed to the intermediate feed hopper. However, as feed is removed from the feed hopper to feed the chickens, at some point the predetermined spring bias strength overcomes the weight of the feed in the hopper and the second member 29 is pulled towards the first member 23 causing the switch to engage the contact surface 28 so that the switch 34 moves to the depressed and on position, which signals for the supply of feed to the feed hopper.

While the Harkins feed control switch attempts to resolve the deficiencies of the flap switch, it still suffers from similar deficiencies. For example, the Harkins switch comprises an open tubular design that exposes both the spring biasing arrangement as well as the tubular members to dust and other airborne particles. Accordingly, constant exposure may cause a build up of grime that interferes with operation of the control switch apparatus.

A further deficiency of the Harkins feed control switch is its tendency to switch on and off rapidly causing unnecessary wear on the feed motor. The rapid switching is caused by the relatively small weight differential required in the intermediate feed hopper to trigger and untrigger the switch. The on and off repetition may result in failure of the motor, which not only results in inefficient feed conversion but also may require a costly replacement of the feed motor.

Therefore, there is a need in the art for an apparatus for controlling the supply of feed to a feed hopper that is not easily exposed to dust and other airborne particles. There is also a need for such an apparatus that may be implemented without causing unnecessary wear on a feed supply motor. There is still an additional need for an apparatus that is easily adjustable for different types of feed and feed hoppers having different weights and densities.

SUMMARY OF THE INVENTION

The present invention satisfies the above described needs by providing an apparatus for automatically regulating the supply of feed to a feed hopper. In general, the hopper feed regulator is suspended between a chicken house ceiling and an intermediate feed hopper. The regulator has a first upper hanger attached to the ceiling and a second lower hanger attached to the feed hopper. A bias means, such as a helical spring, is disposed between the upper and lower hangers. The upper hanger is rigidly fixed to the regulator casing, whereas the lower hanger is configured to move relative to the upper hanger in an axial direction and against the force of the spring. In addition, the regulator, which is connected to a motor, has an on/off switch assembly that is activated by the relative movement of the hangers. When the switch is turned on, the motor is activated and feed is supplied to the feed hopper. As the weight of the feed hopper decreases, the weight of the hopper causes relative movement of the hangers against the force of the spring. Once the hangers have moved past a threshold point, the switch is turned off and no further feed is supplied to the feed hopper.

More particularly, the spring is positioned vertically and is disposed between the upper and lower hangers to support the feed hopper with a predetermined amount of bias tension. The top end of the spring is connected to a lower hanger that extends through the bias means. The lower hanger comes out the bottom end of the spring and is used to suspend the feed hopper. Accordingly, the weight of the feed hopper compresses the spring from the top down. In order to maintain the spring in the proper vertical alignment, the spring is enclosed in a sleeve that is approximately the diameter of the spring. The sleeve is attached to the upper hanger so that the relative movement between the upper hanger and the lower hanger varies the tension on the spring.

An elongated cam is connected to the top end of the spring and lower hanger and thus moves with the top end of the spring and lower hanger. The cam extends through a vertical slot in the sleeve and gradually descends outwardly from the sleeve. Accordingly, the bottom end of the cam is further from the spring than the top end of the cam.

A switch assembly is fixed to the regulator casing adjacent to the first cam with the switch contact, or button, facing the cam. The switch includes an elongated lever that extends over the switch contact and parallel with the sleeve. The bottom end of the lever is fixed to the switch below the switch contact. The top end of the lever extends beyond the switch contact. The top end of the lever includes a wheel assembly that contacts and rolls along the cam.

The device described above functions in the following manner. As the feed contained in the feed hopper empties, the tension on the spring decreases causing the top end of the spring and the connected cam to rise. Because the cam extends away from the spring, cam action causes the wheel assembly to push away from the spring thereby causing the lever to engage the switch contact, (i.e., depress the switch button). The engaged condition of the switch contact causes a motor to supply additional feed into the feed hopper. As the weight increases in the feed hopper, the top of the spring along with the cam descends, which causes the wheel assembly to move along the cam surface and away from the switch contact. Once the lever has moved far enough away from the switch contact, the switch turns off and the motor stops conveying additional feed to the feed hopper.

DETAILED DESCRIPTION

Figure 1:
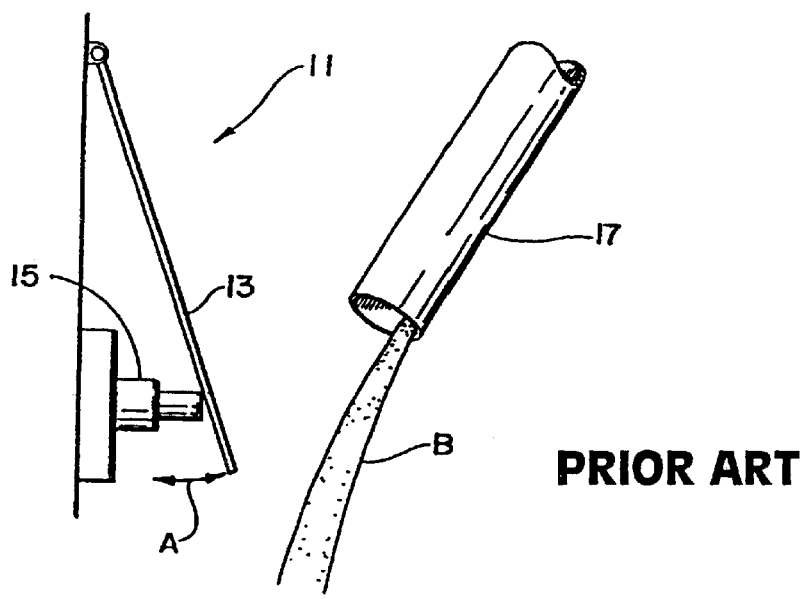
FIG. 1 is an illustration of a known prior art contact switching arrangement using a hinge flap and contact switch to control the supply of feed to an intermediate feed hopper.
Figure 2:
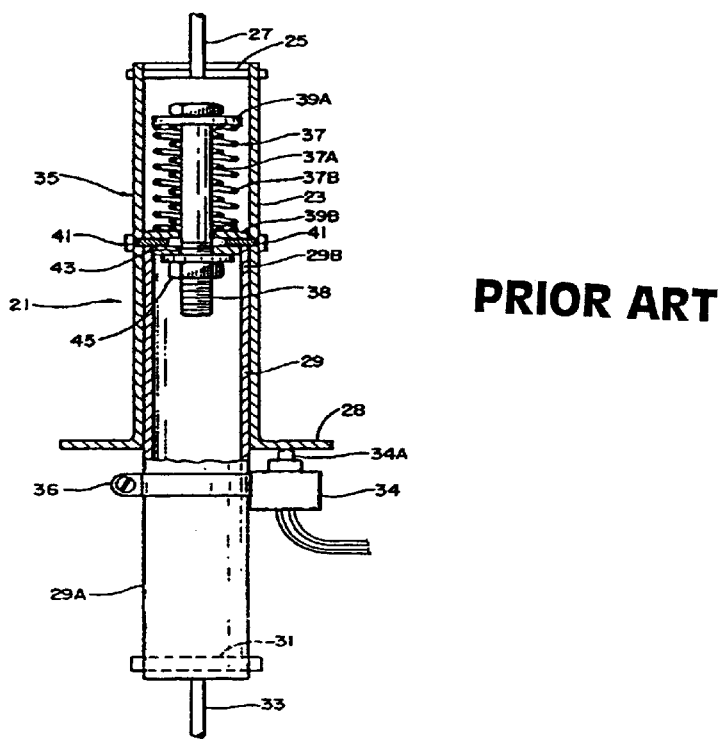
FIG. 2 is an illustration of a known prior art contact switching arrangement using a spring bias means to control the supply of feed to an intermediate feed hopper without the need to contact the feed.

The present invention provides a hopper feed regulator for automatically controlling the supply of feed to a feed hopper. In one embodiment of the present invention, the hopper feed regulator is suspended between a chicken house ceiling and an intermediate feed hopper. The regulator has a first upper hanger attached to the ceiling and a second lower hanger attached to the feed hopper. A bias means, such as a helical spring, is disposed between the upper and lower hangers. The upper hanger is rigidly fixed to the regulator casing, whereas the lower hanger is configured to move relative to the upper hanger in an axial direction and against the force of the spring. In addition, the regulator, which is connected to a motor, has an on/off switch assembly that is activated by the relative movement of the hangers. When the switch is turned on, the motor is activated and feed is supplied to the feed hopper. As the weight of the feed hopper decreases, the weight of the hopper causes relative movement of the hangers against the force of the spring. Once the hangers have moved past a threshold point, the switch is turned off and no further feed is supplied to the feed hopper.

Having briefly described an embodiment of the present invention, an exemplary operating environment for the present invention is described below.

EXEMPLARY OPERATING ENVIRONMENT

Referring now to the drawings, in which like numerals represent like elements throughout the several figures, aspects of the present invention and the exemplary operating environment will be described.

Figure 3:
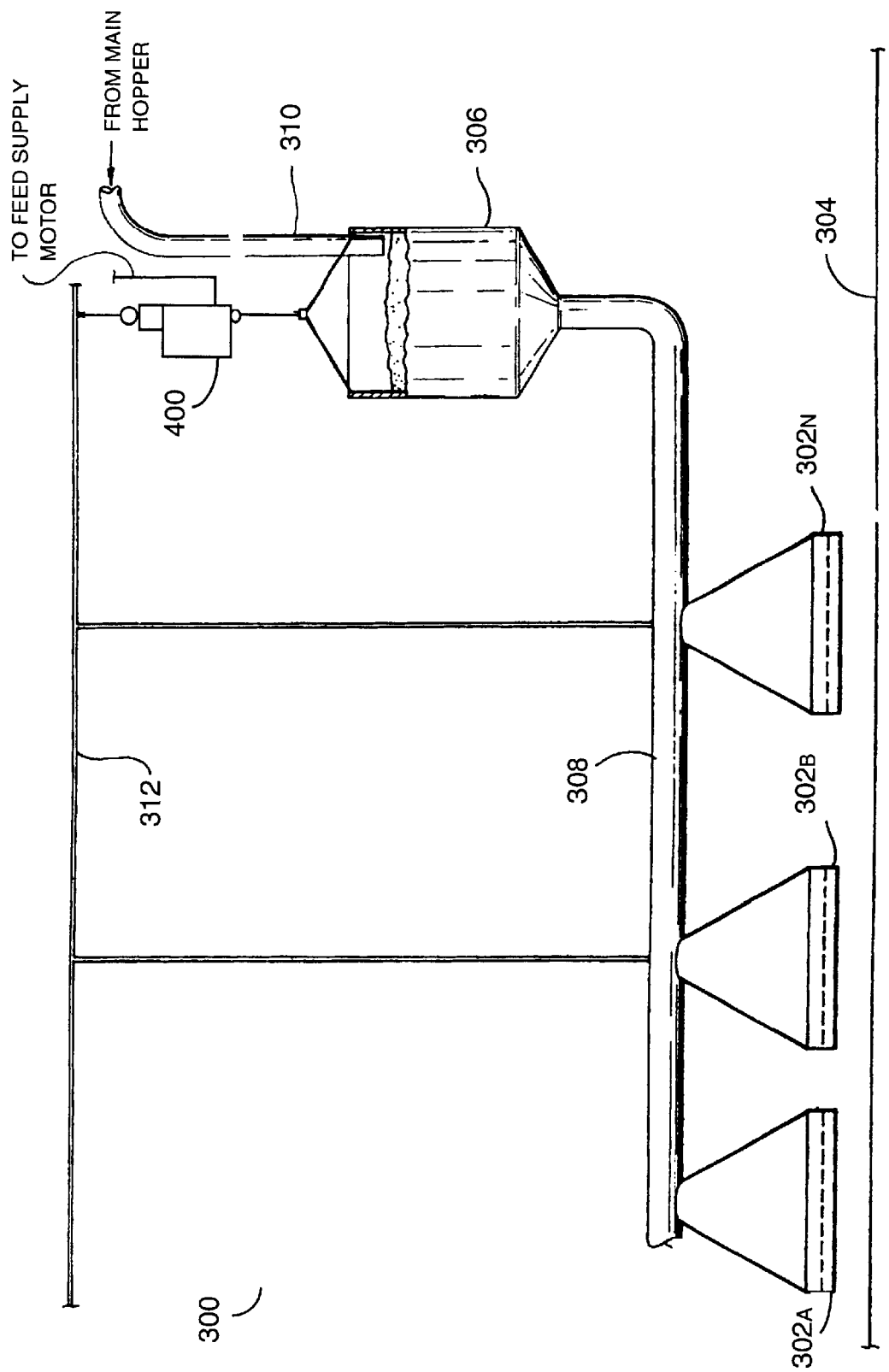
FIG. 3 is a diagram of an exemplary operating environment for the present invention.

With reference to FIG. 3, a diagram of an exemplary system 300 for implementing the invention is illustrated. A plurality of feeding stations suspended above the floor 303 of a chicken coop, such as feeding stations 302a, 302b, . . . 302n, are supplied with feed from an intermediate feed hopper 306 via a feed conduit 308. A feed supply motor (not shown) is used to supply feed to the intermediate feed hopper 306 from a main hopper (not shown) through a second feed conduit 310.

As shown in FIG. 3, the intermediate hopper 306 is suspended from the ceiling 312 of the chicken coop using the hopper feed regulator 400. In addition, the hopper feed regulator 400 is logically connected to a means for supplying feed, such as a feed supply motor, which supplies feed from the main feed hopper to the intermediate hopper 310.

The reader should appreciate that the weight of the feed in the intermediate hopper 306 decreases as feed from the intermediate hopper 306 is used to supply feed to the chickens. If an empty condition is determined, the hopper feed regulator 400 signals for the feed supply motor to transfer feed from the main hopper to the intermediate feed hopper 306. In one embodiment of the present invention, a spring biasing arrangement is combined with a switch assembly and cam to determine whether an empty condition exists and will be further described below with reference to FIG. 4.

Once the weight of feed in the intermediate hopper 306 exceeds the predetermined spring bias strength of the hopper feed regulator 400, the regulator 400 signals the cut off of the supply of feed to be conveyed to the intermediate hopper 306.

Having described an exemplary operating environment for the invention, a diagram illustrating the hopper feed regulator 400 in accordance with an embodiment of the present invention will be described with reference to FIG. 4.

HOPPER FEED REGULATOR

The present invention is directed towards an apparatus for automatically regulating the supply of feed to a feed hopper. Referring to FIG. 4, a frontal cutaway view of one embodiment of the present invention is shown generally at 400. The hopper feed regulator 400 comprises a casing 404 having an upper hanger 402 and two internal compartments 406 and 408. The upper hanger 402 is provided from which the hopper feed regulator 400 may be suspended from a ceiling of a building, such as a chicken house. It should be appreciated that the upper hanger may be used alone or in combination with other means, such as rope, twine, chain, etc., to secure the hopper feed regulator 400 to the ceiling.

A lower hanger 430, separate from casing 404, is provided to secure and suspend the intermediate feed hopper 306 (FIG. 3). The lower hanger 430 is attached to a shaft 432, such as a threaded bolt. The shaft 432 is inserted through a hole (not shown) in the casing 404 so that the shaft 432 may be positioned partially within chamber 406 and partially outside of casing 404.

A biasing arrangement 410, such as a helical spring, is disposed between the upper hanger 402 and the lower hanger 430 and around the shaft 432. However it should be understood that the biasing arrangement 410 may incorporate other means for urging the lower hanger 430 upwardly in relation to the upper hanger 402.

The biasing arrangement 410 is provided for suspending the lower hanger 430 and feed hopper 306 (FIG. 3) at a predetermined bias strength. The predetermined bias strength is set so that the weight of the hopper when loaded with the desired amount of feed will overcome the bias strength of the arrangement 410 and cause a switch assembly 420 to remain in its off position. At weights substantially equaling an empty condition of the feed hopper 306, however, the bias strength is sufficiently strong to engage the switch assembly 420, thereby signaling the feed supply motor to supply feed to the intermediate feed hopper 306.

The reader should appreciate that the chamber 406 should securely envelope the biasing arrangement 410 while allowing free axial movement, i.e., compression of the biasing arrangement 410. In other words, chamber 406 is approximately the diameter of the spring biasing arrangement in order to maintain the spring biasing arrangement 410 in the proper vertical alignment.

Figure 4:
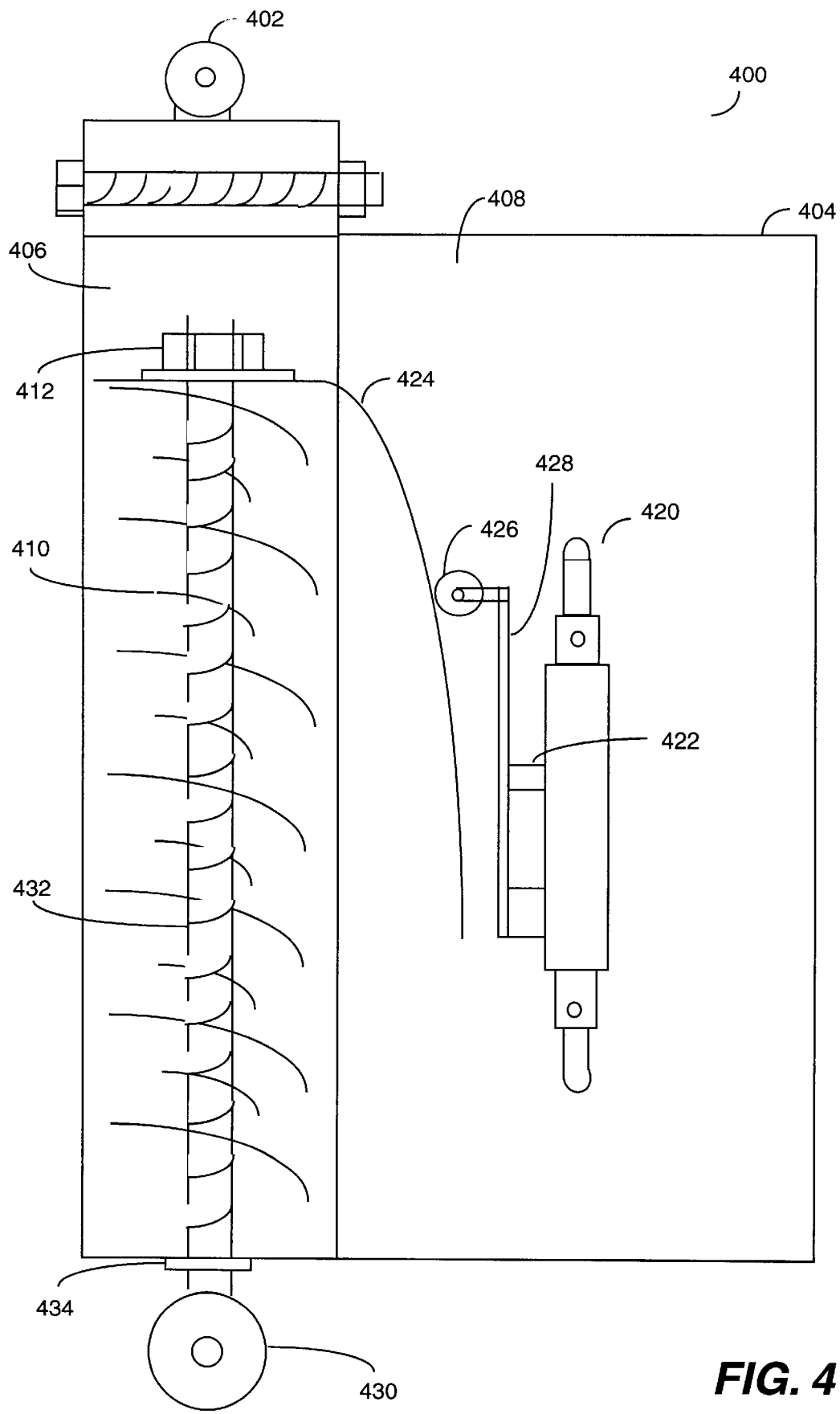
FIG. 4 is a front cutaway view illustrating one embodiment of the feed control switch of the present invention.

As shown in FIG. 4, the opposing end of the lower hanger 430 and shaft 432 is fixed to the top of the biasing arrangement 410. In one embodiment of the present invention, a flat washer and screw assembly 412 may be used to fasten the shaft 432 to the top of the biasing arrangement 410. The shaft 432 and lower hanger 430 are configured to move in an axial direction relative to the upper hanger 402 and against the force of the biasing arrangement 410. In other words, the biasing arrangement 410 is positioned vertically to support the intermediate feed hopper 306 (FIG. 3) with a predetermined amount of tension so that the relative movement between the upper hanger 402 and the lower hanger 430 varies the tension on the bias arrangement 410.

In addition, an elongated cam 424 is fixed at the top of the biasing arrangement 410 and moves with the flat washer and screw assembly 412 in the axial direction relative to the upper hanger 402 and against the force of the biasing arrangement. The cam 424 extends away from the shaft 432 and into chamber 408 through a vertical slot (not shown) running in the same axial direction as the shaft. The vertical slot must extend enough of the length of chamber 406 to allow the cam 424 to move freely with the axial movement of the flat washer and screw assembly 412. From the vertical slot, the cam 424 curves and gradually extends downwardly into chamber 408. Accordingly, as shown in FIG. 4, the detached end of the cam 424 is progressively further from the vertical slot as the cam extends into the chamber 408.

The hopper feed regulator 400 further comprises a side mounted switch assembly 420 in chamber 408. The switch assembly 420, which is logically connected to a feed supply motor, signals the feed supply motor to supply feed to the intermediate feed hopper 306 (FIG. 3) when a switch assembly button 422 is in the depressed position. Alternatively, the switch assembly 420 signals the feed supply motor to discontinue supplying feed to the intermediate feed hopper 306 (FIG. 3) when the switch assembly button 422 is in the released position.

As shown in FIG. 4, the switch assembly 420 is mounted parallel to the shaft 432 with the switch assembly button 422 facing the shaft 432. The switch assembly 420 includes a lever 428 that extends over the button 422 and runs parallel to shaft 432. One end of the lever 428 is affixed to the switch assembly 420 at a position below the button 422. The opposing end of the lever 428 extends beyond the switch assembly button 422 and includes a wheel assembly 426 that contacts and rolls along the cam 424.

The device described above functions in the following manner. As the feed contained in the intermediate feed hopper 306 (FIG. 3) empties, the reducing weight of the hopper 306 (FIG. 3) causes relative movement of the hangers 402 and 430 by means of the opposing tension of the biasing arrangement 410. In other words, the tension on the biasing arrangement 410 decreases causing it to decompress or elongate. Accordingly, the top end of the biasing arrangement 410, which is also connected to the cam 424, will rise in the axial direction. Because the cam 424 curves away from the biasing arrangement 410, as the cam rises with the top of the biasing arrangement, the wheel assembly 426 rolls along the rising cam and pushes the lever 428 away from the biasing arrangement.

It should be understood that as the lever 428 pushes away from the biasing arrangement 410, the lever depresses the switch assembly switch button 422 thereby engaging the feed supply motor. More particularly, once the rising cam 424 sufficiently pushes the wheel assembly 426 and lever 428 to overcome the button throw of switch assembly button 422, the switch assembly 420 signals the feed supply motor to begin supplying feed to the intermediate feed hopper 306 (FIG. 3). The button throw is defined as the distance of travel between the on and off positions of switch assembly button 422.

As feed is supplied to the feed hopper 306, the process described above operates in reverse manner. Accordingly, once the weight of the intermediate feed hopper 306 sufficiently compresses the biasing arrangement 410, the switch assembly button 422 is released and no further feed is supplied to the hopper 306. More particularly, as the weight of the feed hopper 306 increases, the top of the biasing arrangement 410 along with the cam 424 descends axially, compressing the biasing arrangement. As the cam 424 descends, the wheel assembly 426 rolls along the surface of the cam 424, which relaxes the lever 428. Once the lever 428 travels the distance equaling the button throw, the switch assembly 420 signals the feed supply motor to stop conveying additional feed to the feed hopper 306.

Figure 5:
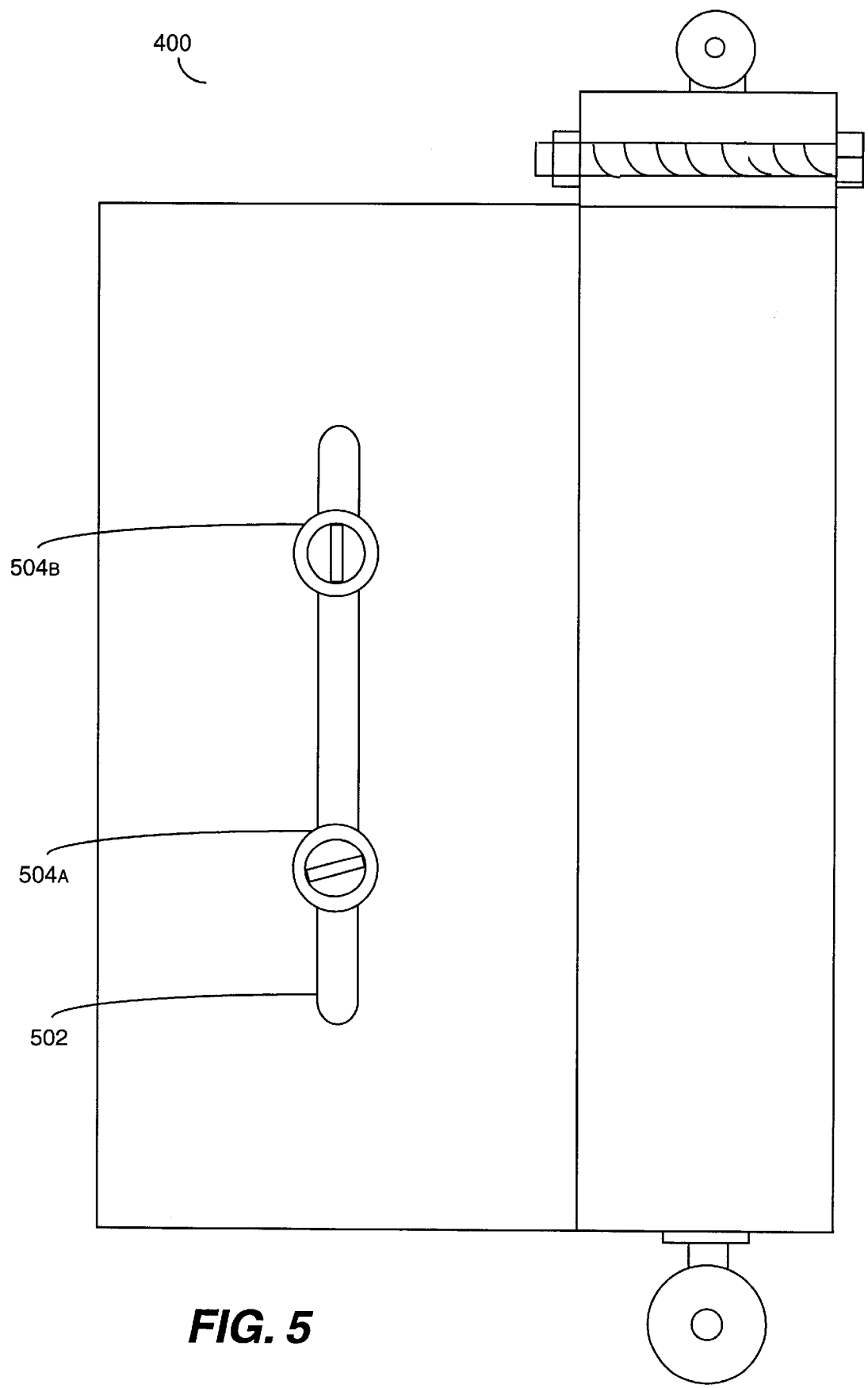
FIG. 5 is a back view illustrating one embodiment of the feed control switch of the present invention.

In another embodiment of the present invention, the hopper feed regulator 400 may be easily adjustable as to the amount of feed required to trigger and release the switch assembly button 422. For example, referring now to FIGS. 4 and 5, one embodiment of an adjustable hopper feed regulator 400 will be described. A vertical slot 502 is shown in the back casing of the chamber 408 and running parallel with the shaft 434. The switch assembly 420 is mounted inside chamber 408 using two washer and screw assemblies 504a and 504b. The two washer and screw assemblies 504a and 504b may be loosened to slide the switch assembly 420 up or down the vertical slot 502. A plastic sheath (not shown) may also be included to cover the vertical slot 502 and protect chamber 408 from accumulating airborne particles.

Accordingly, in order to set the feed hopper regulator 400 so that a selected amount of feed is consistently supplied to the feed hopper 306 (FIG. 3), the washer and screw assemblies 504a and 504b, which hold the switch assembly 420 to chamber 408, is released and moved down (i.e., engaged) so that a supply of feed is provided to the feed hopper6. When a desired quantity of feed is furnished to the feed hopper 306, the switch assembly 420 is slid up and secured so that the switch assembly button 422 is in the released position. In this fashion, the quiescent point of operation of the feed hopper regulator 400 is set so that the desired amount or weight of feed supplied to the feed hopper 306 is always delivered to the feed hopper.

In one embodiment of the present invention, the cam 424 has an approximate slope of −8. The reader should appreciate that alternative embodiments may comprise different and varying slopes depending on the type of switch, length of switch button throw, weight of the intermediate feed hopper, and the weight and density of the feed.

Although the present invention has been described above with particular reference to poultry farming, it should be understood that alternative embodiments utilizing material other than chicken feed will become apparent to those skilled in the art to which the present invention pertains without departing from its spirit and scope. In addition, while the present invention has been described with particular reference to its preferred embodiments, it should be understood that many variations and modifications will now be obvious to those skilled in that art, and it is preferred, therefore, that the scope of the invention be is defined by the appended claims rather than the foregoing description.

What is claimed is:

1. A regulating device for switching on and off the supply of material to be transferred to a hopper, the regulating device comprising:
   a first member comprising:
      a first hanger from which the hopper is suspended, the first hanger having an axial extent;
      an elongated cam associated with the first hanger and curved so as to have a radial location proportional to the axial extent of the first hanger;
   a second member comprising:
      a second hanger from which the regulating device is suspended;
      an electrical switch having an operating element that turns the electrical switch to a first state when the operating element is at a first position and turns the electrical switch to a second state when the operating element is at a second position, the electrical switch being positioned adjacent to the cam;
      a lever operatively associated with the operating element and positioned for movement on the cam; and,
   biasing means operative to urge the first and second members towards each other at a predetermined bias strength;
   wherein, when the predetermined bias strength exceeds the weight of the material in the hopper, the first member is pulled towards the second member causing the lever to move along the curve of the cam to a first radial location whereat the operating element turns the electrical switch to the first state to initiate the supply of material to be conveyed to the hopper, and
   wherein, when the weight of the material in the hopper exceeds the predetermined bias strength, the first member pulls away from the second member causing the lever element to move along the cam to a second radial location whereat the operating element turns the electrical switch to the second state terminating the supply of material to the hopper.

2. The apparatus of claim 1, wherein the biasing means comprises a helical coil compression spring.

3. The apparatus of claim 1, wherein the second member further comprises an elongated slot for attaching the electrical switch and provides the capability for adjusting the position of the electrical switch relative to the cam.

4. The apparatus of claim 3, wherein the electrical switch is attached through the elongated slot using at least one screw and washer assemblies.

5. The apparatus of claim 1, wherein the first and second members are made of stainless steel.

6. A regulating device for switching on and off the supply of material to be transferred to a hopper, the regulating device comprising:
   a first member comprising:
      a first hanger from which the hopper is suspended;
      a threaded bolt attached to the first hanger;
      an elongated cam attached to the opposite end of the threaded bolt and having a curved surface that extends axially so that the cam is a further radial distance from the first hanger as the cam descends;
   a second member comprising:
      a second hanger from which the regulating device is suspended;
      a switch assembly comprising:
         an electrical switch having a switch button that turns off the electrical switch when the switch button is at an extended position and turns on the electrical switch when the switch button is at a depressed position, the electrical switch being positioned adjacent to the cam;

a hinged lever attached to the electrical switch and extending over the switch button;

a wheel assembly attached to the lever that rolls along the cam;

a biasing means for pulling the first and second members towards each other at a previously determined bias strength;

wherein, when the predetermined bias strength exceeds the weight of the material in the hopper, the first member is pulled towards the second member causing the wheel assembly to move along the curved surface of the rising cam so that the lever depresses the switch button, thereby turning on the electrical switch and the supply of feed to be conveyed to the hopper, and wherein, when the weight of the material in the hopper exceeds the predetermined bias strength, the first member pulls away from the second member causing the wheel assembly to move along the curved surface of the descending cam so that the lever disengages the switch button, thereby turning off the electrical switch and the supply of feed to the hopper.

7. The apparatus of claim 6, wherein the biasing means comprises a helical coil compression spring.

8. The apparatus of claim 6, wherein the second member further comprises an elongated slot for attaching the electrical switch and provides the capability for adjusting the position of the electrical switch relative to the cam.

* * * * *